(12) United States Patent
Stoll et al.

(10) Patent No.: US 9,995,309 B2
(45) Date of Patent: Jun. 12, 2018

(54) VACUUM SYSTEM

(71) Applicant: Pfeiffer Vacuum GmbH, Asslar (DE)

(72) Inventors: Tobias Stoll, Hohenahr (DE); Robert Watz, Weilburg (DE); Michael Schweighoefer, Schoeffengrund (DE)

(73) Assignee: PFEIFFER VACUUM GMBH, Asslar (DE)

( * ) Notice: Subject to any disclaimer, the term of this patent is extended or adjusted under 35 U.S.C. 154(b) by 424 days.

(21) Appl. No.: 14/228,427

(22) Filed: Mar. 28, 2014

(65) Prior Publication Data

US 2014/0306407 A1 Oct. 16, 2014

(30) Foreign Application Priority Data

Apr. 11, 2013 (DE) .................. 10 2013 103 650

(51) Int. Cl.
| | |
|---|---|
| *F04D 29/16* | (2006.01) |
| *F04D 29/08* | (2006.01) |
| *F04D 29/52* | (2006.01) |
| *F04D 19/04* | (2006.01) |
| *F16L 23/16* | (2006.01) |
| *F04D 29/02* | (2006.01) |

(52) U.S. Cl.
CPC ............ *F04D 29/16* (2013.01); *F04D 19/04* (2013.01); *F04D 29/083* (2013.01); *F04D 29/522* (2013.01); *F16L 23/16* (2013.01); *F04D 29/023* (2013.01); *F05D 2300/171* (2013.01); *F05D 2300/43* (2013.01)

(58) Field of Classification Search
CPC ...... F04D 19/04; F04D 29/023; F04D 29/083; F04D 29/16; F04D 29/522; F05D 2300/171; F05D 2300/43; F16L 23/16
See application file for complete search history.

(56) References Cited

U.S. PATENT DOCUMENTS

| | | | |
|---|---|---|---|
| 3,144,035 A | * | 8/1964 | Hablanian ............... B01J 3/006 137/1 |
| 8,529,218 B2 | | 11/2013 | Makarov |
| 2007/0258836 A1 | | 11/2007 | Hofmann |

FOREIGN PATENT DOCUMENTS

| | | |
|---|---|---|
| CN | 202851311 | 4/2013 |
| DE | 24 16 808 | 10/1975 |
| DE | G9304435 U1 | 6/1993 |
| DE | 292 23 455 | 10/1998 |
| DE | 29723 455 | 10/1998 |
| GB | 2504329 A | 1/2014 |
| WO | 2014/016551 A | 1/2014 |

\* cited by examiner

*Primary Examiner* — Audrey K Bradley
(74) *Attorney, Agent, or Firm* — Abelman, Frayne & Schwab

(57) ABSTRACT

A vacuum pump includes at least one vacuum port for releasably connecting the vacuum pump with at least one recipient an elastomeric seal for sealing the vacuum port against atmosphere a diaphragm gland provided on a vacuum side of the vacuum port and at least one of at least one suction channel and at least one suction opening provided between the elastomeric seal and the diaphragm gland.

12 Claims, 5 Drawing Sheets

VACUUM SYSTEM

BACKGROUND OF THE INVENTION

1. Field of the Invention

The invention relates to a vacuum system including a vacuum pump and at least one to-be-evacuated recipient.

2. Description of the Prior Art

The state of the art (DE 24 16 808 A1) discloses a sealing element for vacuum purposes. The known sealing element is formed of metal because sealing elements which are formed of an elastomeric material are not heat-resistant and, therefore, cannot be used at high temperatures. In particular, when the recipient becomes heated, the elastomeric sealing elements become unusable because these sealing elements have a tendency to outgasing and, thus, "contaminate" the vacuum. In addition, often, the elastomeric sealing elements become permeable, i.e., gases can wander through the elastomeric element.

The drawback of the state-of-the art metal sealing elements consists in that they, as a rule, can be used only once or, at most, several times because the metal does not have the advantage of the elastomeric material, namely, an elastic deformability. Therefore, with each strong deformation, a new sealing element should be used. Because the metal sealing elements are often formed of an expensive material (copper, indium, gold or the like), the costs of the metal sealing elements are relatively high.

State of the art (DE 24 16 808 A1) suggests to form a seal of metal and a centering ring as a spring ring with a radial slot. However, this shape is very expensive and, therefore, this sealing element is very costly.

Known are UHV (ultra high vacuum)—flanges. These flanges have cutting edges and, e.g., copper sealing elements. Between two flanges, a copper ring is arranged. The concentrically extending cutting edges of the flanges penetrate in the copper and form a metal sealing which is characterized by an extremely low leakage and permeability and a high temperature resistance. These flanges are also called Conflat® flanges (registered trade mark of the firm Agilent Technologies Inc., U.S.A.) or CF-flanges. The drawback of these flanges consists in that they act on the metal sealing elements. Because of the lasting deformation of the metal sealing elements, their multiple uses are not any more possible. Thus, they can only be used once.

The object of the invention is to provide a vacuum system in which very low pressures are achieved, in particular in the high vacuum suction region, while using an elastomeric seal.

SUMMARY OF THE INVENTION

These and other objects of the present invention which will become apparent hereinafter, are achieved by providing a vacuum system including at least one vacuum port for releasably connecting the vacuum system with at least one recipient and wherein there is provided an elastomeric seal for sealing a releasable connection between the vacuum pump and the at least one recipient against atmosphere, and a diaphragm gland on a vacuum side of the releasable connection, and which is characterized by at least one suction channel and/or at least one suction opening provided between the elastomeric seal and the diaphragm gland.

At sealing points, on an atmospheric side, at least one elastomeric seal is provided. The elastomeric seal advantageously is formed as an O-ring. Between the elastomeric seal and, e.g., an ultra high vacuum (UHV) port, at least one diaphragm gland (end face mechanical seal), which functions as a second sealing element, is provided. The flanges of the recipients (chambers) and the flange of the pump housing are pressed against each other. Therefore, the flatness and surface quality play an important role. The existing clearance should be equal to zero in an ideal case.

Because of outgasing and diffusion processes, a gas load is generated between the elastomeric seal and the diaphragm gland. The gas load increases pressure in the UHV-region.

In order to prevent the pressure increase, according to the invention, suction takes place between the elastomeric seal and the diaphragm gland. To effectively use the suction process, the conductance should be as high as possible. In order to realize a high conductance, there is provided a suction channel which is advantageously formed by free-milling and/or free-drilling.

This channel advantageously is connected with an intermediate stage having a high pressure (in comparison with the UHV-region). An effective suction insures that the UHV-pressure remains stable. The larger the suction channel is formed, less space is needed for the diaphragm gland. Therefore, it makes sense to evacuate the suction channel at several points in order to divide the channel in short sections with a good conductance. A second suction channel that does not influence the seal gap, can also be used, e.g., because it can lie in a different plane.

The suction channel can have one or more outlets for evacuation. The object is to achieve a conductance as high as possible. The formation of the suction channel with one or several outlets permits to optimize the conductance.

The principle of the inventive sealing can be realized with both linear geometry and circular geometry. Equally, this principle can be realized in a plane or with a cylindrical or three-dimensional structures.

Within the inventive sealing configuration, one or more ports can be arranged which, e.g., can be provided at different pressure levels.

The suction between the elastomeric seal and the diaphragm gland can be effected in a vacuum port within or outside of the inventive sealing configuration.

Further vacuum ports can be provided outside of the inventive sealing configuration. The pump vacuum ports can lie in the same plane. It is also possible to spread them in several planes.

The inventive sealing configuration can be implemented using arbitrary attachment or insertable components.

Respective profiles can be formed in the vacuum pump housing or in a counter-part.

The suction can take place inside or outside of the housing. The suction can also take place in an intermediate stage through, e.g., hoses, tubes, chambers and other suitable attachment components.

The inventive sealing principle is not limited to the UHV-ports and attachment components of the housing. Also the chamber, i.e., the recipient can be sealed at different points in accordance with this principle. In this case, the suction again can take place, using a tube, within the chamber or within the pump housing or the like and lead to a suitable intermediate state.

Instead of an intermediate stage port, other depressurization means can be used for carrying out suction. Thus, e.g., a further vacuum pump can be used. This makes sense when, e.g., more than a single pump are used with a multi-chamber system.

The flanges of the pump housing can be formed of stainless steel but also of a lighter metal, e.g., aluminum. The flange counter-part and the sealing element can be used, when realized according to the present invention, several times, which is not possible with conventional cutting ring seals.

The inventive vacuum system has apparent advantages over the state-of-the art. In the state-of-the art, in UHV-regions, metal seals are used. As a rule, these are used with stainless steel housings and chambers. As a rule, in this case, metal seals are formed of a lighter metal so that a seal is formed as a result of deformation of the metal seal on a stronger stainless steel. These seals, as opposed to the inventive solution, can be used, as a rule, only once.

The state-of-the art requires greater pressing forces to achieve the deformation of the sealing elements.

As a result, the flanges must have a reduced strength, and a large number of fastening elements is required. The inventive sealing concept permits the use of a filigree flange geometry as the flange counterpart pressure is much smaller.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings which show several exemplary embodiments of the inventive vacuum system.

DETAILED DESCRIPTION OF THE PREFERRED EMBODIMENTS

Figure 1:
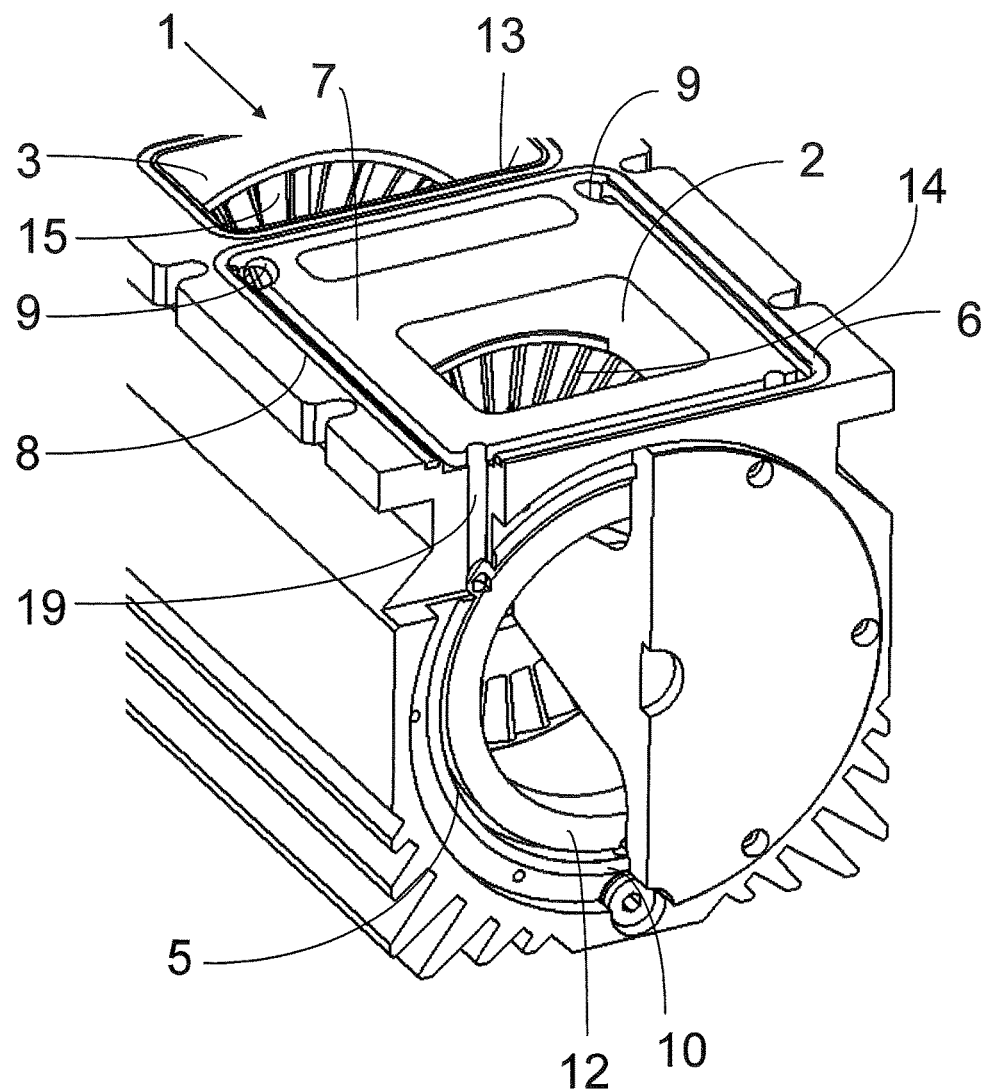
FIG. 1 a perspective view of a vacuum pump with vacuum ports.
Figure 2:
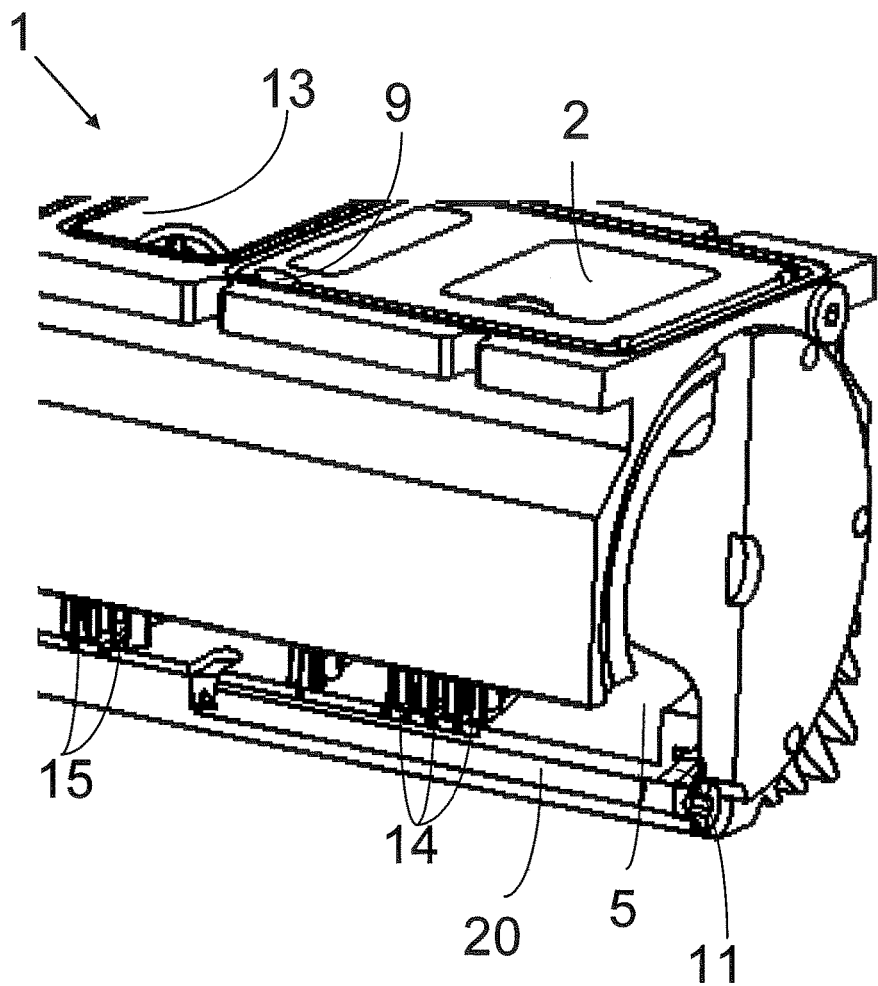
FIG. 2 a longitudinal cut-out view of the vacuum pump shown in FIG. 1.

FIGS. 1 and 2 show a vacuum pump having vacuum ports 2, 3, and 5 for a recipient (not shown).

The vacuum port 2 is provided, on its side facing atmosphere, with an elastomeric seal 6. On its vacuum side, the vacuum port 2 is provided with a diaphragm gland 7. Because upon heating of the recipient (not shown), the elastomeric seal 6 has a tendency to outgas sing, there is provided a suction channel 8 with openings 9 through which the gas can be aspirated. The vacuum port 5 is likewise provided with an elastomeric seal 10 and a suction opening 11 which is located in the housing insert 12.

The suction openings 9 are evacuated in the intermediate stage 13. Rotatable impellers 14, 15 are provided in the vacuum pump 1.

Figure 3:
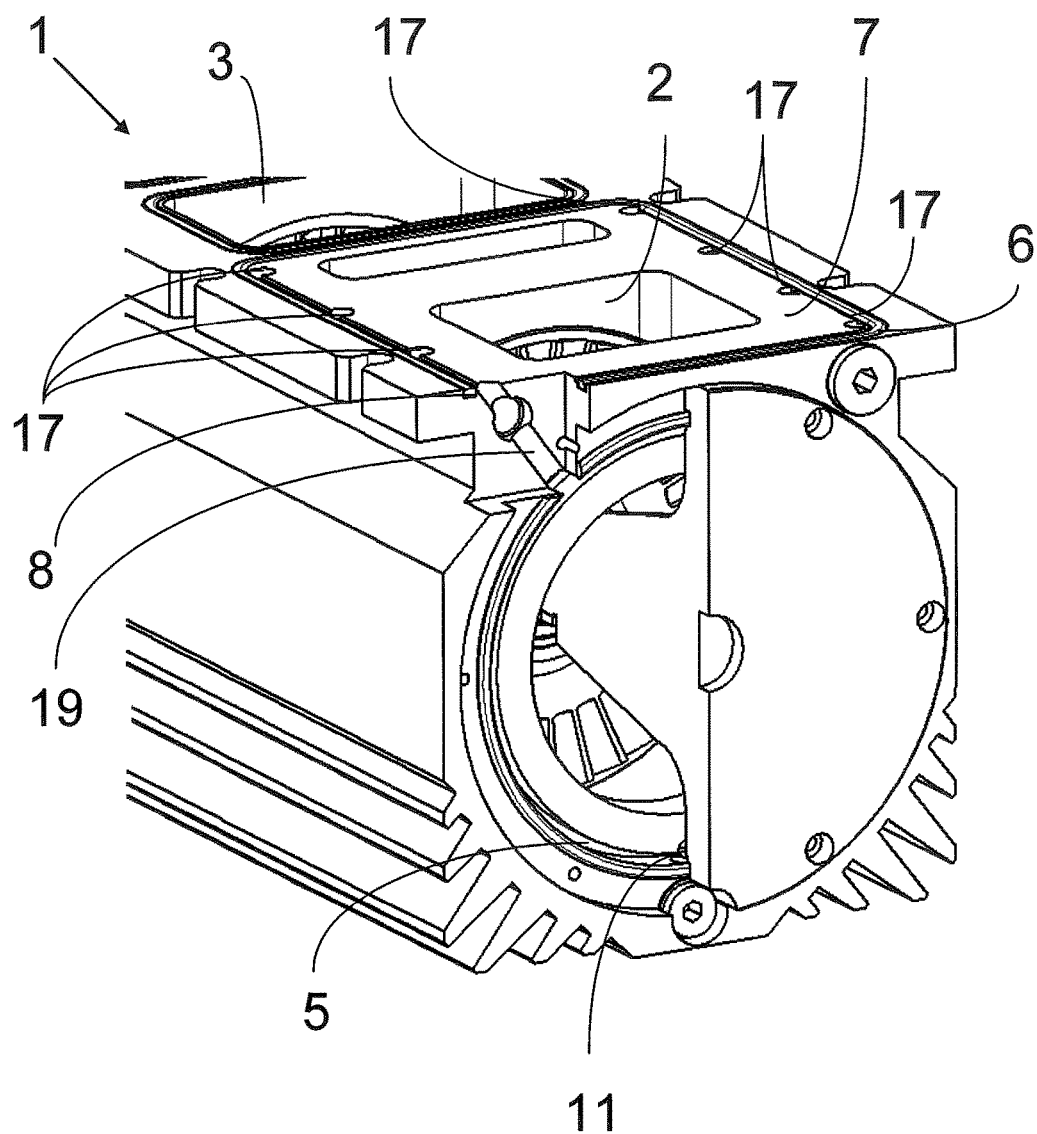
FIG. 3 a perspective view of a modified embodiment of a vacuum pump shown in FIG. 1.
Figure 4:
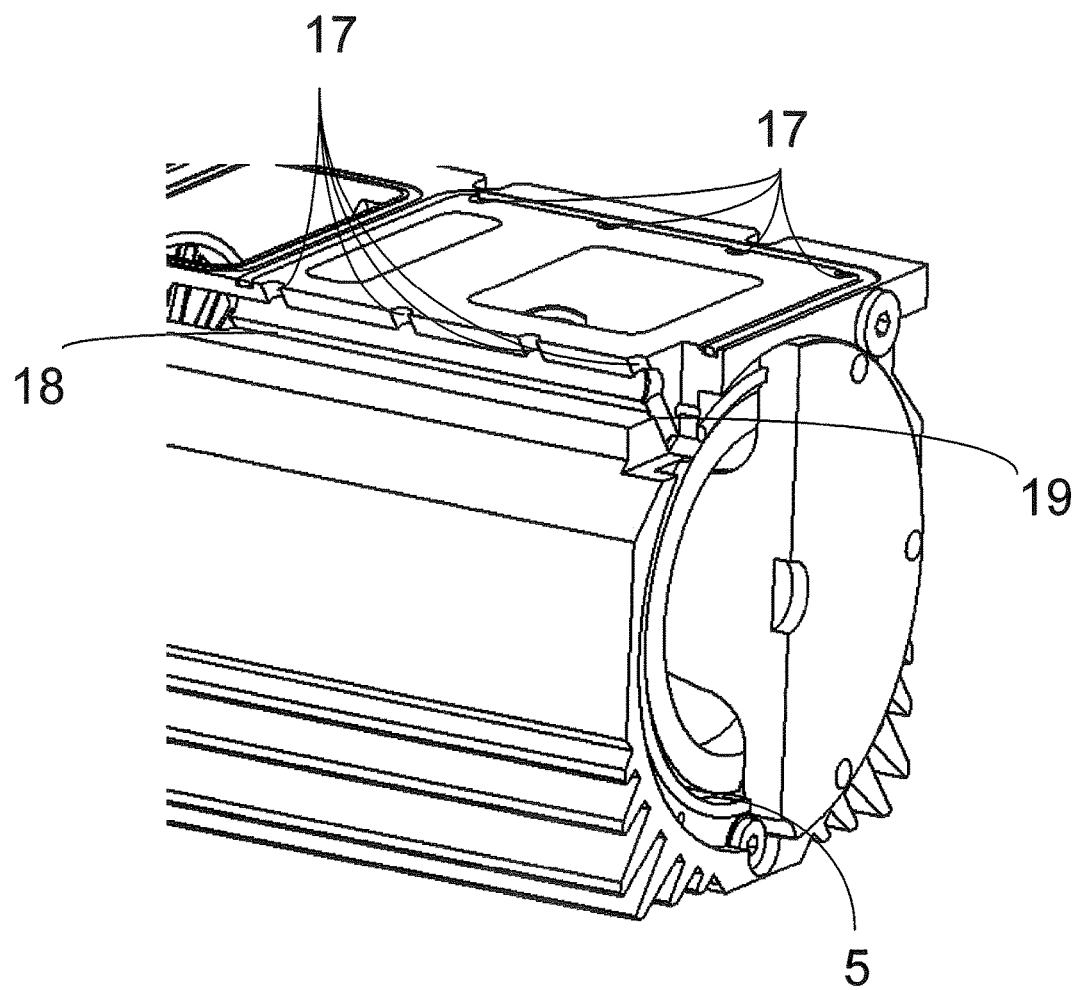
FIG. 4 a longitudinal cut-out view of the vacuum pump shown in FIG. 3.

FIGS. 3 and 4 likewise show a vacuum pump 1 with vacuum ports 2, 3 and 5. The vacuum port 2 has an elastomeric seal 6 and a diaphragm gland 7. A suction channel 8 is provided between the elastomeric seal 6 and the diaphragm gland 7.

In the suction channel 8, intermediate suction elements 17 are provided. A suction opening 11 is provided in the vacuum port 5. As shown in FIG. 4, the intermediate suction elements 17 extend toward a through-bore 18 leading to the intermediate stage 3. A connection element 19 connects the seal arrangement of the vacuum port 5 with the through-bore 18 so that the vacuum port 5 is evacuated through the suction opening 11 and as well as the through-bore 18.

Figure 5:
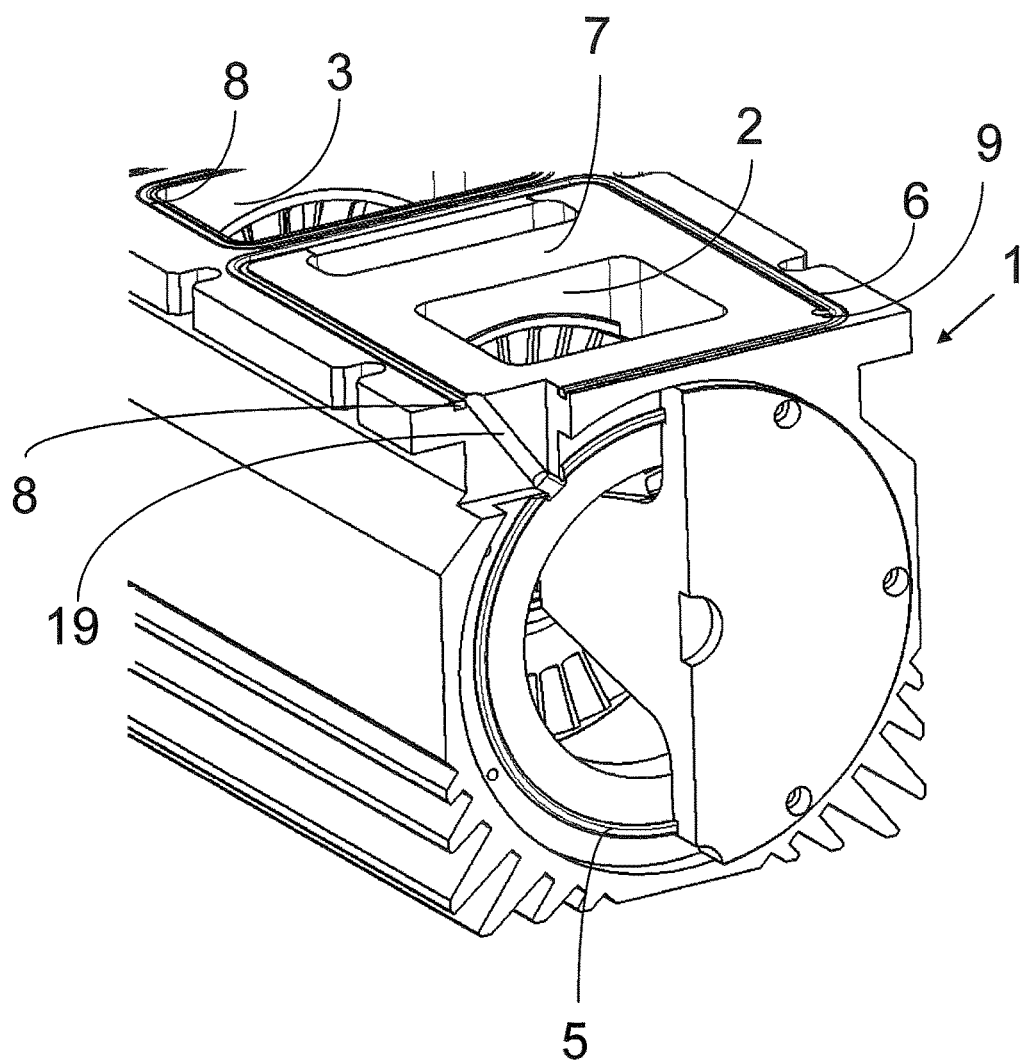
FIG. 5 a perspective view of a still further embodiment of a vacuum pump.

FIG. 5 shows a further modified embodiment of a vacuum pump with a vacuum port 2 that is sealed, on its atmospheric side, with an elastomeric ring 6 and, on its vacuum side with a diaphragm gland ring 7. A suction channel 8 is provided between the elastomering seal 6 and the diaphragm gland 7. The evacuation of the channel 8 takes place through the suction openings 9 which communicate with a through-bore (not shown) of the seal arrangement of the vacuum port 5 that is aspirated through the suction opening 11.

Though the present invention was shown and described with references to the preferred embodiments, those are merely illustrative of the present invention and is not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A vacuum pump, comprising an inlet flange having at least one vacuum port (2) for releasably connecting the vacuum pump with at least one recipient;
   an elastomeric seal (6) provided in the inlet flange for sealing a releasable connection between the vacuum pump and the at least one recipient against atmosphere;
   a diaphragm gland (7) provided in the inlet flange on a vacuum side of the releasable connection and surrounded by the elastomeric seal; and
   at least one of at least one suction channel (8) and at least one suction opening (9, 11, 17) provided between the elastomeric seal (6) and the diaphragm gland (7);
   wherein the vacuum pump has at least one further vacuum port (3, 5) and the at least one further vacuum port is provided on the inlet flange outside of the elastomeric seal (6) and the diaphragm gland (7).

2. A vacuum pump according to claim 1, comprising a through-bore (18), wherein the vacuum pump comprises both the at least one suction opening (9, 11, 17) and the at least one suction channel (8), and
   wherein the at least one suction opening (17) is provided in the at least one suction channel (8) for connecting the at least one suction channel (8) with the through-bore (18).

3. A vacuum pump according to claim 1, wherein the elastomeric seal (6) is formed as an O-ring seal.

4. A vacuum pump according to claim 1, wherein the vacuum pump comprises the at least one suction channel (8), and
   wherein the at least one suction channel (8) is formed by at least one of free-drilling and free-milling.

5. A vacuum pump according to claim 1,
   wherein the vacuum pump comprises both the at least one suction channel (8) and the at least one suction opening (9, 17) both of which are provided between the elastomeric seal (6) and the diaphragm gland (7), and
   wherein the at least one suction opening (9, 17) forms an outlet of the at least one suction channel (8) for evacuating same.

6. A vacuum pump according to claim 1, wherein a vacuum connection of the at least one recipient is provided between the elastomeric seal (6) and the diaphragm gland (7).

7. A vacuum system according to claim 1, wherein suction between the elastomeric seal (6) and the diaphragm gland (7) is effected in one of the at least one and the at least one further vacuum ports (3) within or outside of the elastomeric seal (6) and the diaphragm gland (7).

8. A vacuum pump according to claim 1, wherein the at least one vacuum port (2) and the at least one further vacuum port (3, 5) are provided in different planes.

9. A vacuum pump according to claim 1, comprising yet another vacuum ports, and wherein all of the vacuum ports (2, 3, 5) lie at different levels.

10. A vacuum pump according to claim 1, wherein the at least one vacuum port is an ultra-high vacuum port, and wherein the elastomeric seal (6) and the diaphragm gland (7) are provided for sealing the at least one ultra-high vacuum port.

11. A vacuum pump according to claim 1, wherein the elastomeric seal (6) and the diaphragm gland (7) are arranged in at least one of the inlet flange, a mountable part, and an insertable part of the vacuum pump.

12. A vacuum pump according to claim 11, wherein the inlet flange of the vacuum pump is formed of metal selected from a group consisting of stainless steel and aluminum.

\* \* \* \* \*